`(12)` United States Patent
Kuroda et al.

`(10)` Patent No.: US 9,523,776 B2
`(45)` Date of Patent: Dec. 20, 2016

`(54)` RADIATION DETECTOR AND RADIATION DETECTION METHOD

`(71)` Applicant: Kabushiki Kaisha Toshiba, Minato-ku (JP)

`(72)` Inventors: Hidehiko Kuroda, Yokohama (JP); Kunihiko Nakayama, Tama (JP); Kei Takakura, Yokohama (JP); Mikio Izumi, Yokohama (JP)

`(73)` Assignee: Kabushiki Kaisha Toshiba, Minato-ku (JP)

`( * )` Notice: Subject to any disclaimer, the term of this patent is extended or adjusted under 35 U.S.C. 154(b) by 222 days.

`(21)` Appl. No.: 14/474,437

`(22)` Filed: Sep. 2, 2014

`(65)` Prior Publication Data

US 2015/0323678 A1    Nov. 12, 2015

`(30)` Foreign Application Priority Data

Sep. 30, 2013  (JP) .................................. 2013-205557

`(51)` Int. Cl.
*G01T 1/24*   (2006.01)
*G01T 1/02*   (2006.01)
(Continued)

`(52)` U.S. Cl.
CPC ............ *G01T 1/026* (2013.01); *G01T 1/169* (2013.01); *G01T 1/18* (2013.01); *G01T 1/205* (2013.01); *G01T 1/24* (2013.01)

`(58)` Field of Classification Search
CPC ............ G01T 1/026; G01T 1/24; G01T 1/18
(Continued)

`(56)` References Cited

U.S. PATENT DOCUMENTS 6,281,502 B1 *  8/2001  Pineau .................. G01T 1/169
                                                250/361 R
7,308,203 B1 * 12/2007  Koenck ................ H04B 10/118
                                                398/118
(Continued)

FOREIGN PATENT DOCUMENTS

EP           1 944 626 A2    7/2008

OTHER PUBLICATIONS

Extended European Search Report issued Mar. 5, 2015 in Patent Application No. 14185944.7.
(Continued)

*Primary Examiner* — David Porta
*Assistant Examiner* — Djura Malevic
`(74)` *Attorney, Agent, or Firm* — Oblon, McClelland, Maier & Neustadt, L.L.P.

`(57)` ABSTRACT

An embodiment of a radiation detector has: a light collecting member; a photo detector that can receive light collected by the light collecting member and count number of photons; a wavelength selector that can selectively transmit light based on the light emission of gas caused by alpha rays by selectively transmitting light of a wavelength in a specific range; a shielding device that is can switch between an opened state in which it transmits light and a closed state in which it shields light; and a counting unit that calculates an alpha dose based on a difference calculated by subtracting number of noise photons detected in the photo detector within a predetermined time period when the shielding device is in the closed state from the number of photons received by the photo detector within the predetermined time period when the shielding device is opened state.

14 Claims, 6 Drawing Sheets

(51) Int. Cl.
*G01T 1/18* (2006.01)
*G01T 1/169* (2006.01)
*G01T 1/205* (2006.01)

(58) Field of Classification Search
USPC .................................. 250/361 R, 362, 368
See application file for complete search history.

(56) References Cited

U.S. PATENT DOCUMENTS

| | | | | |
|---|---|---|---|---|
| 7,515,681 | B2* | 4/2009 | Ebstein | G01T 1/02 378/19 |
| 7,773,204 | B1* | 8/2010 | Nelson | G01S 13/48 356/5.02 |
| 8,890,077 | B2* | 11/2014 | Rosson | G01N 21/6402 250/361 R |
| 9,046,619 | B2* | 6/2015 | Blackburn | G01V 5/0016 |
| 2004/0120844 | A1* | 6/2004 | Tribelsky | A61L 2/0082 422/2 |
| 2006/0022115 | A1* | 2/2006 | Byren | G02B 26/06 250/201.9 |
| 2007/0181815 | A1* | 8/2007 | Ebstein | G01T 1/02 250/370.11 |
| 2009/0078883 | A1* | 3/2009 | Perel | H01J 37/244 250/396 R |
| 2009/0166539 | A1 | 7/2009 | Ruan et al. | |
| 2010/0059665 | A1* | 3/2010 | Sampayan | H05H 9/00 250/251 |
| 2012/0112076 | A1* | 5/2012 | Rosson | G01N 21/6402 250/361 R |

OTHER PUBLICATIONS

Sergiy M. Baschenko, "Remote optical detection of alpha particle sources", Journal of Radiological Protection, Institute of Physics Publishing, vol. 24, (2004), pp. 75-82.

F. Lamadie et al. "Remote Alpha Imaging in Nuclear Installations: New Results and Prospects", IEEE Transactions on Nuclear Science, vol. 52, No. 6, 2005, 5 pages.

J. Sand et al. "Remote Optical Detection of Alpha Radiation", IAEA-CN-184/23, . 6 pages.

* cited by examiner

RADIATION DETECTOR AND RADIATION DETECTION METHOD

CROSS REFERENCES TO RELATED APPLICATIONS

This application is based upon and claims the benefits of priority from the prior Japanese Patent Applications No. 2013-205557, filed in the Japanese Patent Office on Sep. 30, 2013, the entire content of which is incorporated herein by reference.

FIELD

Embodiments of the present invention relate to a radiation detector and a radiation detection method that detect alpha rays by utilizing a light emission phenomenon of gas caused by alpha rays.

BACKGROUND

For example, as a detector of alpha rays, there is known a detector using a ZnS scintillator that emits light in response to incident alpha rays. Further, there is known a radiation detector that utilizes a fact that alpha rays make nitrogen in the atmosphere emit light to observe light emission of nitrogen and to thereby detect alpha rays.

There is known, as the radiation detector that observes light emission of nitrogen, a radiation detector including a collecting lens that collects light based on the light emission of nitrogen, a wavelength selecting element that extracts the light emission of nitrogen from the collected emission light, an optical element that separates the extracted light emission of nitrogen into transmitted light and reflected light, an optical element that changes a propagation direction of the reflected light, photo detectors that receive respectively the transmitted and reflected lights and count the number of photons, and a signal processor that detects the light emission of nitrogen caused by alpha rays based on simultaneous measurement of the transmitted light and the reflected light by the photo detectors (refer to, for example, Non-Patent Document 1: Remote Optical Detection of Alpha Radiation, IAEA-CN-184/23, the entire content of which is incorporated herein by reference.

According to the conventional technology disclosed in Non-patent Document 1, the light emission of nitrogen is selectively extracted by the wavelength selecting element and then branched into two lights. For the two lights, the number of photons is counted using the two photo detectors. At this time, the two photo detectors each also detect a noise signal due to ambient temperature or radiation. The light-emitting photons of nitrogen are observed simultaneously in the two photo detectors, while the noise signals detected in the respective two detectors are temporally independent of each other. Thus, the signal processor can detect a signal corresponding to the light emission of nitrogen by extracting a signal measured simultaneously by the two detectors. As a result, it is possible to selectively observe the light emission of nitrogen to thereby allow detection of alpha rays.

However, in the above-described radiation detector, the photon counting is performed for the branched two emission lights of nitrogen caused by alpha rays using the two photo detectors, so that when the number of alpha rays emitted is small and, accordingly, the number of light-emitting photons of nitrogen is small, detection of the photons becomes difficult.

BRIEF DESCRIPTION OF THE DRAWINGS

FIGS. 4A and 4B are graphs each illustrating an example in which a count result obtained by a counting unit in the first embodiment of the radiation detector according to the present invention is displayed on a display section, in which FIG. 4A is a view illustrating a count result obtained when a shielding device is opened, and FIG. 4B is a view illustrating a count result obtained when the shielding device is closed;

DETAILED DESCRIPTION

Embodiments of the present invention have been made to solve the above problem, and an object thereof is to allow detection of weak alpha rays in measurement of alpha rays made by detecting light based on light emission of gas caused by alpha rays.

According to an aspect of the present invention, there is provided a radiation detector comprising: a light collecting member that can collect light based on light emission of gas caused by alpha rays; a photo detector that can receive light collected by the light collecting member and count number of photons; a wavelength selector that is disposed on an optical path at an upstream side of the photo detector and can selectively transmit light based on the light emission of gas caused by alpha rays by selectively transmitting light of a wavelength in a specific range; a counting unit that is configured to calculate an alpha dose based on a difference subtracting a number of noise photons at the photo detector under a first condition where the light emission of gas caused by alpha rays is not collected to the photo detector, from the number of photons detected at the photo detector under a second condition where light emission of gas caused by alpha rays is collected to the photo detector.

According to another aspect of the present invention, there is provided a radiation detection method comprising: collecting light as collected light based on light emission of gas caused by alpha rays; selectively transmitting the collected light having a specific wavelength range; detecting the light collected and selectively transmitted by a photo detector; obtaining a number of noise photons at the photo detector in a shielded condition where the light based on light emission of gas caused by alpha rays is shielded; and calculating an alpha dose based on a difference subtracting the number of noise photons obtained from the number of photons detected at the photo detector.

Hereinafter, embodiments of a radiation detector according to the present invention will be described with reference to the drawings. Throughout the description, the same reference numerals are given to the same or similar parts, and the repeated description will be omitted.

First Embodiment

Configuration of First Embodiment

Figure 1:
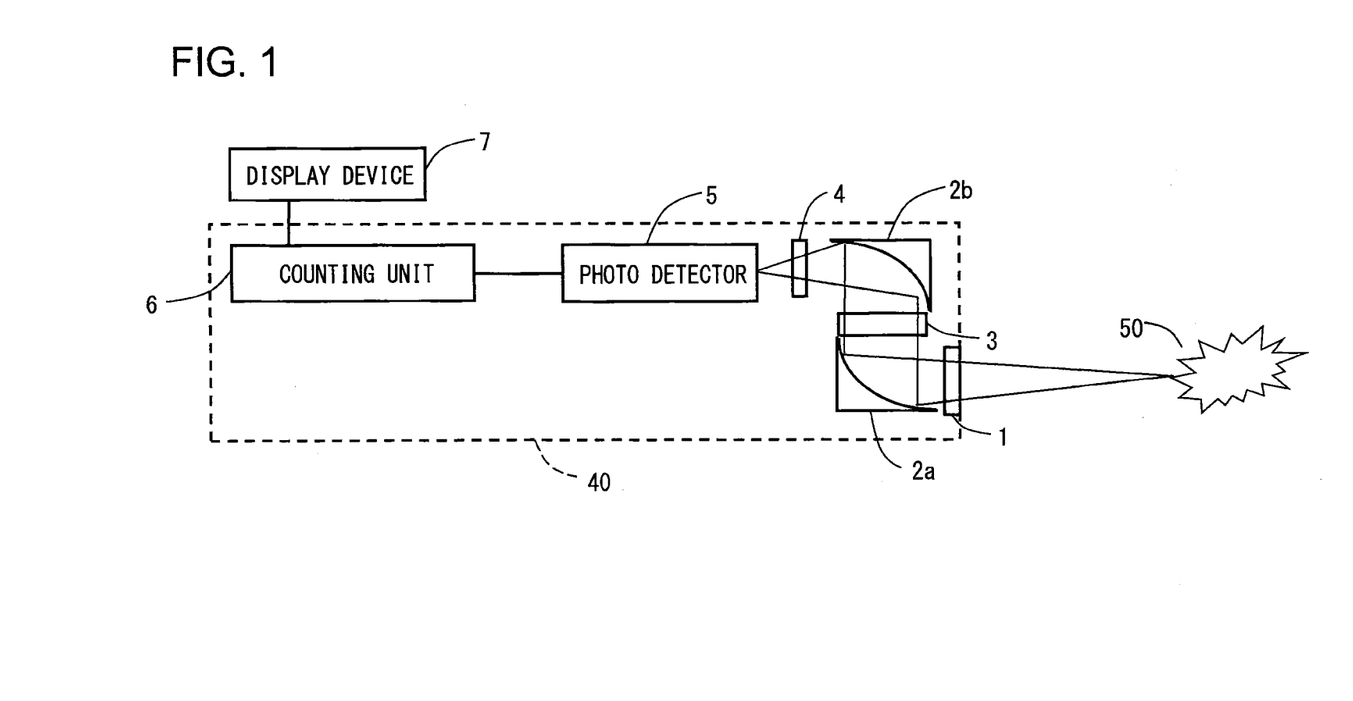
FIG. 1 is a block diagram illustrating a configuration of a first embodiment of a radiation detector according to the present invention.

A radiation detector according to a first embodiment of the present invention will be described using FIG. 1. The radiation detector of FIG. 1 detects light (in particular, ultraviolet rays) from a light-emitting source 50 based on light emission of gas caused by alpha rays, thereby detecting alpha rays. The radiation detector includes a polarization selecting element 1, light collecting members 2a and 2b, a wavelength selector 3, a shielding device 4, a photo detector 5, a counting unit 6, and a display device 7. The components other than the display device 7, that is, the polarization selecting element 1, the light collecting members 2a and 2b, the wavelength selector 3, the shielding device 4, the photo detector 5, and the counting unit 6 are housed in a common casing 40.

The polarization selecting element 1 transmits the light based on light emission of gas caused by alpha rays therethrough and reduces incidence of other light components from observed polarization direction. The polarization selecting element 1 is constituted by, for example, a polarization plate or a polarization prism that extracts a linearly polarized component. For example, as the polarization prism, a Glan-Thomson prism or a Glan-Taylor prism can be used.

Figure 2:
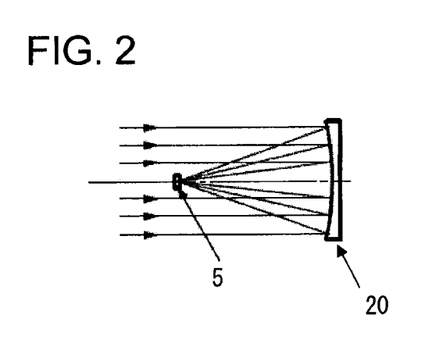
FIG. 2 is a view illustrating a specific configuration of a light collecting member in the first embodiment of the radiation detector according to the present invention.
Figure 3:
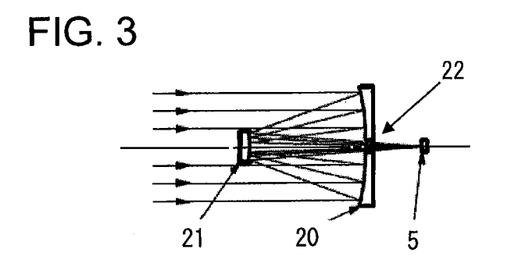
FIG. 3 is a view illustrating another specific configuration of the light collecting member in the first embodiment of the radiation detector according to the present invention.

The light collecting members 2a and 2b collect the light based on light emission of gas caused by alpha rays that has been transmitted through the polarization selecting element 1 and are each constituted by a reflective optical system. The light collecting members 2a and 2b are disposed such that light reflected by the light collecting member 2a is further reflected by the light collecting member 2b. In the example illustrated in FIG. 1, the light collecting members 2a and 2b are constituted by two concave mirrors. Alternatively, the light collecting members 2a and 2b may be constituted by a single concave mirror 20 illustrated in FIG. 2. Further alternatively, the light collecting members 2a and 2b may be constituted by a combination of a single concave mirror 20 and a single convex mirror 21 as illustrated in FIG. 3. In the configuration of FIG. 3, a through hole 22 is formed in the concave mirror 20. A reflective surface of the concave mirror or convex mirror may be a spherical surface or a paraboloidal surface. The reflective optical system is advantageous in that increase in diameter can be easily achieved and a focal length is not affected by a wavelength, in contrast to a refractive optical system.

The wavelength selector 3 is a band-pass filter that transmits light of a specific wavelength band therethrough. The wavelength selector 3 is constituted by a wavelength selecting element of an interference type, an absorption type, a diffraction type, or a scattering type. Although the wavelength selector 3 is disposed between the light collecting members 2a and 2b in the example of FIG. 1, it may be alternatively disposed between the light collecting member 2a and the polarization selecting element 1 or between the light collecting member 2b and the shielding device 4.

The shielding device 4 is disposed between the light collecting member 2b and the photo detector 5, and switches between passage and shielding of observation light by means of a mechanical or an electronic shutter. For example, the shielding device 4 drives a plate for shielding light to shield the light. Further, the shielding device 4 may be constituted by an AO element (acoustooptical element) or an EO element (electrooptical element) capable of deflecting or shielding light.

The photo detector 5 receives the observation light when the shielding device 4 is opened and counts the number of photons. The photo detector 5 is a photo detector for detecting weak light. Specifically, the photo detector 5 may be a high-sensitivity detector such as a photomultiplier tube, a PIN photodiode, or an avalanche photodiode. Further, an image sensor can also be used as the photo detector 5. Specifically, a high-sensitivity image sensor such as an EM (electron multiplier type) CCD (charge-coupled device), a cooled CCD, or an image intensifier can be used.

The counting unit 6 receives an output of the photo detector 5 and calculates an alpha dose from a difference between a count number of photons and a count number of noise. The counting unit 6 counts a pulse signal output from the photo detector 5. The counting unit 6 may be a counting circuit constituted by an analog circuit or a digital circuit or may perform counting in a software manner.

The display device 7 displays the count numbers and alpha dose calculated by the counting unit 6. The display device 7 includes an analog or digital display circuit, a liquid crystal or cathode-ray tube display screen, and the like.

Operation of First Embodiment

When alpha rays are emitted from radioactive contaminants, nitrogen in the atmosphere is excited to cause light emission in an ultraviolet region although it is weak, and photons are scattered in all directions from the light-emitting source 50 in the vicinity of the radioactive contaminant surface. The emitted lights have different wavelengths although they are within the ultraviolet region. On the other hand, in addition to the light-emitting photons of nitrogen, noise light such as sunlight or light from various illuminations exists in the environment.

In a case where the observation light composed of the light-emitting photons of nitrogen and noise light is received by the radiation detector according to the present embodiment, the noise light has a high probability of reaching the polarization selecting element 1 after being reflected by various objects, and polarization is highly likely to be deflected. Thus, a direction of a linearly polarized light in which the noise light becomes weakest is selected to reduce the noise light in the observation light.

Subsequently, the light collecting members 2a and 2b are used to collect the light-emitting photons of nitrogen that spread isotropically. The light collecting members 2a and 2b, which are reflective optical system, can easily achieve increase in diameter and have no wavelength dependency of a focal length in contrast to a refractive system. This prevents displacement of the optical system to make it possible to effectively collect the light-emitting photons of nitrogen.

After that, the wavelength selector 3 is used to selectively transmit a light-emitting wavelength of nitrogen to thereby further reduce the noise light in the observation light. In a case where an interference type wavelength selector is used as the wavelength selector 3, the observation light is made to be incident thereon so as to coincide with a normal line thereof for obtaining a target transmission wavelength.

The light-emitting photons of nitrogen that have been transmitted through the wavelength selector 3 are further transmitted through the shielding device 4 to be received by the photo detector 5.

The counting unit 6 performs counting for a certain period of time and adds up the count number of light-emitting photons of nitrogen and the count number of noise generated inside the photo detector 5. The display device 7 displays a count result as illustrated in FIG. 4A.

Figure 4:
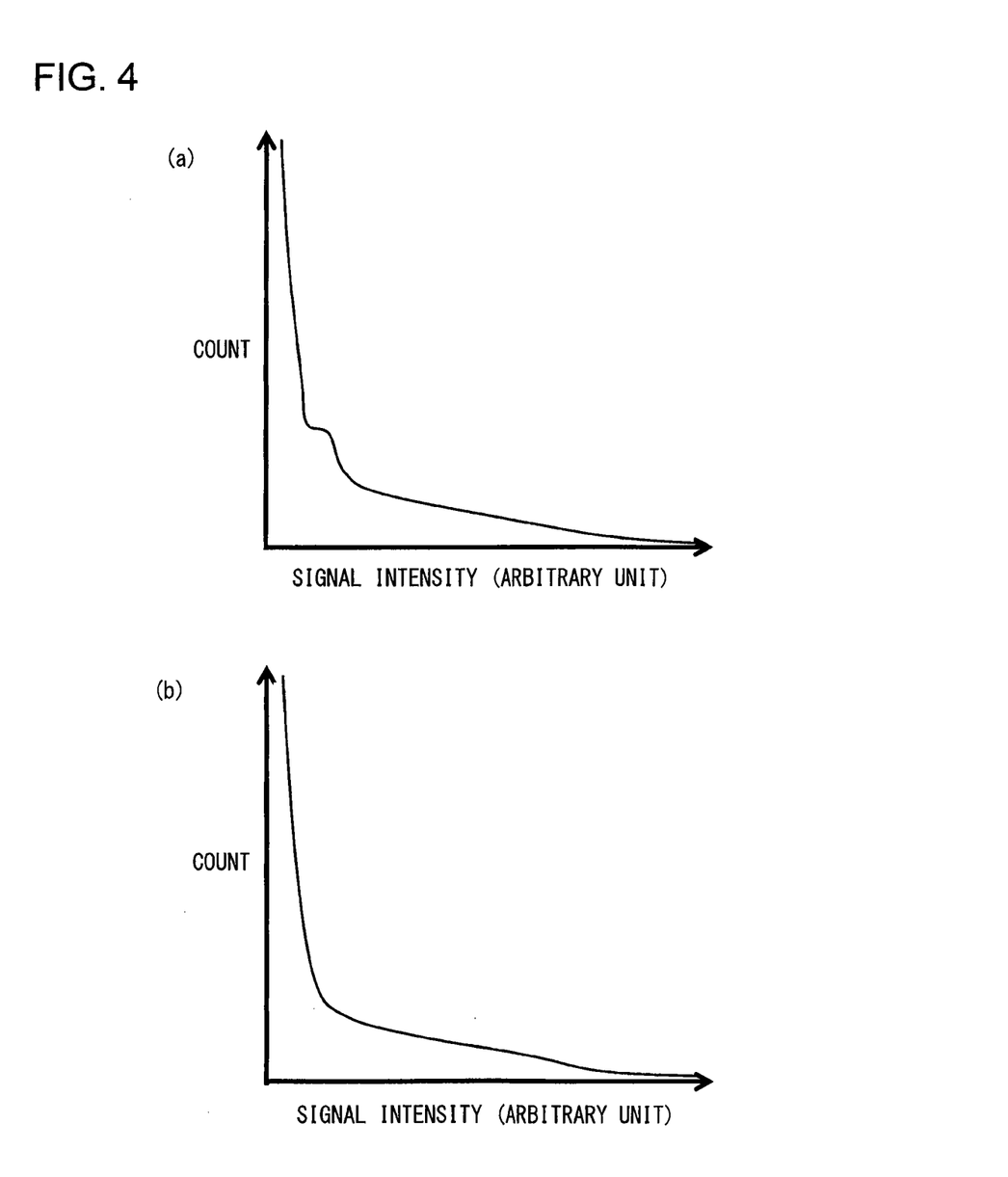

Subsequently, the shielding device 4 is activated to shield the observation light for a period of time equal to that during which the observation light was transmitted, with the result that only the count number of noise generated inside the photo detector 5 can be counted, and the display device 7 displays a count result as illustrated in FIG. 4B. Then, by calculating a difference between the count value of FIG. 4A and count value of FIG. 4B, it is possible to calculate the count number of the light-emitting photons of nitrogen.

Thus, from presence/absence of the count numbers of the light-emitting photons, the alpha rays can be detected on the display device 7. Further, by grasping a relationship between the count number and alpha dose in advance, the alpha dose can be quantified. Furthermore, by increasing the counting time period to increase the count number, measurement accuracy can be enhanced.

Effect of First Embodiment

As described above, the light-emitting photons of nitrogen caused by alpha rays are observed and counted in the photo detector 5, and a difference between this count result and count number obtained when light to the photo detector 5 is shielded by the shielding device 4 is calculated. As a result, it is possible to remove the count number of noise inside the photo detector 5 to thereby calculate only the count number of the light-emitting photons of nitrogen. Thus, even when the amount of alpha rays is small and, accordingly, the number of light-emitting photons of nitrogen is small, the light-emitting photons can be counted, and alpha rays can be detected from presence/absence of the count numbers. Further, by grasping the relationship between the count number and alpha dose in advance, the alpha dose can be quantified.

Further, by selecting a direction of the linearly polarized light in which the noise light included in the observation light becomes weakest using the polarization selecting element 1, it is possible to reduce the noise light in the observation light, thereby allowing the photo detector 5 to selectively observe the light-emitting photons of nitrogen. Thus, even when the amount of alpha rays is small and, accordingly, the number of light-emitting photons of nitrogen is small, the light-emitting photons can be counted, and alpha rays can be detected from presence/absence of the count numbers. Further, by grasping the relationship between the count number and alpha dose in advance, the alpha dose can be quantified.

Further, the light collecting members 2a and 2b are reflective optical systems and thus can easily achieve increase in diameter and have no wavelength dependency of a focal length in contrast to a refraction system. This prevents displacement of the optical system to make it possible to effectively collect the light-emitting photons of nitrogen. Thus, even when the amount of alpha rays is small and, accordingly, the number of light-emitting photons of nitrogen is small, the light-emitting photons can be counted, and alpha rays can be detected from presence/absence of the count numbers. Further, by grasping the relationship between the count number and alpha dose in advance, the alpha dose can be quantified.

Second Embodiment

Configuration of Second Embodiment

Figure 5:
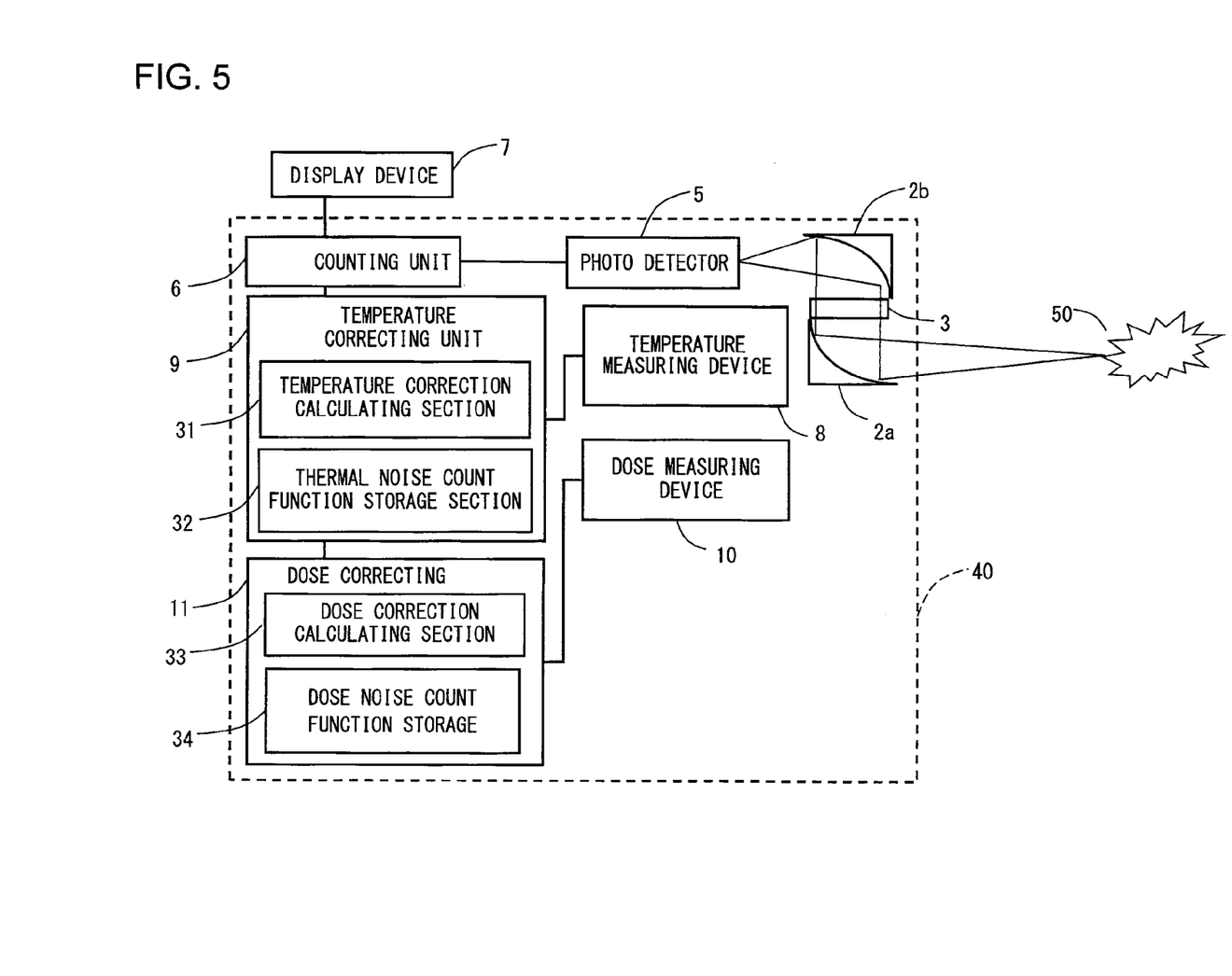
FIG. 5 is a block diagram illustrating a configuration of a second embodiment of the radiation detector according to the present invention.

A radiation detector according to a second embodiment of the present invention will be described using FIG. 5. The same reference numerals are given to the same parts as in the first embodiment and the repeated description will be omitted.

The radiation detector according to the second embodiment includes a temperature measuring device 8, a temperature correcting unit 9, a dose measuring device 10, and a dose correcting unit 11 in addition to the light collecting members 2a and 2b, the wavelength selector 3, the photo detector 5, the counting unit 6, and the display device 7. The radiation detector according to the second embodiment does not have the shielding device 4 and polarization selecting element 1 which are provided in the first embodiment (FIG. 1). However, the polarization selecting element 1 may be provided in the radiation detector according to the second embodiment.

The temperature measuring device 8 is attached to the photo detector 5 and measures a temperature in the vicinity of the photo detector 5. More specifically, the temperature measuring device 8 is a means for measuring a temperature of an internal circuit of the photo detector 5. As the temperature measuring device 8, a thermocouple, a platinum resistor-type temperature sensing element, a thermistor, a radiation thermometer, a liquid column thermometer, a bimetal thermometer, or the like may be used.

The temperature correcting unit 9 calculates the count number of noise by referring to count numbers at various temperatures stored in advance, and includes a temperature correction calculating section 31 and a thermal noise count function storage section 32.

The temperature correcting unit 9 stores count results of the noise at various temperatures when light to a receiving surface of the photo detector 5 is shielded. Since thermal noise I varies with temperature, as can be seen from a relational expression shown in the following formula (1), the count results of the noise at various temperatures are required.

$$I^2 = 4kTB/R \qquad (1)$$

where k is a Boltzmann constant, T is a temperature, B is a bandwidth of the photo detector, and R is a resistance.

The dose measuring device 10 is attached to the photo detector 5 and measures ambient dose in the vicinity of the photo detector 5. As the dose measuring device 10, an ionization chamber type pocket dosimeter, a semiconductor type detector, or the like can be used.

The dose correcting unit 11 calculates the count number of noise by referring to count numbers at various doses in advance and includes a dose correction calculating section 33 and a dose noise count function storage section 34. The dose correcting unit 11 stores count results of the noise at various doses when light to the receiving surface of the photo detector 5 is shielded. Since noise caused by radiation varies with dose, the count results of the noise at various doses are required.

The counting unit 6 calculates the alpha dose from a difference between the count number of photons and count number of noise.

Operation of Second Embodiment

Light emitted from the light-emitting source 50 is collected by the light collecting members 2a and 2b, and the collected light is transmitted through the wavelength selector 3 to be received by the photo detector 5. Then, the counting unit 6 performs counting for a certain period of time and adds up the count number of light-emitting photons of nitrogen and the count number of noise generated inside the photo detector 5. The display device 7 displays a count result as illustrated in FIG. 4A. At this time, a temperature of the photo detector 5 is measured by the temperature measuring device 8, and as illustrated in FIG. 4B, a count result of noise that has been generated inside the photo detector 5 and influenced by the temperature is obtained by the temperature correcting unit 9.

Details of operation of the temperature correcting unit 9 are as follows. That is, as a preparation stage before collection of the light based on light emission of gas caused by alpha rays and detection thereof, the temperature measuring device 8 is used to measure an ambient temperature in the vicinity of the photo detector 5 under a condition that the light based on the light emission of gas caused by alpha rays is not collected. Then, at the various measured temperatures, the count number of thermal noise, which is the number of noise photons obtained in the photo detector 5, is obtained and, thereby, a thermal noise count function representing a relationship between the count number of thermal noise and ambient temperature is stored in the thermal noise count function storage section 32 in advance.

Then, the temperature correction calculating section 31 uses the thermal noise count function stored in the thermal noise count function storage section 32 to calculate the count number of thermal noise based on the ambient temperature that the temperature measuring device 8 measures under a condition that the light based on the light emission of gas caused by alpha rays is collected and received by the photo detector 5.

Then, the counting unit 6 obtains a count result as illustrated in FIG. 4B. Then, by calculating a difference by subtracting the count value of FIG. 4B from the count value of FIG. 4A, the count number of light-emitting photons of nitrogen can be calculated. Thus, from presence/absence of the count numbers of the light-emitting photons, the alpha rays can be detected on the display device 7. Further, by grasping a relationship between the count number and alpha dose in advance, the alpha dose can be quantified. Furthermore, by increasing the counting time period to increase the count number, measurement accuracy can be enhanced.

Further, dose in the vicinity of the photo detector 5 is measured by the dose measuring device 10. Then, by referring to the dose correcting unit 11, a count result of noise that has been generated inside the photo detector 5 and influenced by the radiation can be obtained. Then, by subtracting the count result of noise caused by the radiation from the obtained count result, the count number of light-emitting photons of nitrogen can be calculated.

Details of operation of the dose correcting unit 11 are as follows. That is, as a preparation stage before collection of the light based on light emission of gas caused by alpha rays and detection thereof, the dose measuring device 10 is used to measure an ambient dose in the vicinity of the photo detector 5 under the condition that the light based on the light emission of gas caused by alpha rays is not collected. Then, at the various measured doses, the count number of dose noise, which is the number of noise photons obtained in the photo detector 5, is obtained and, thereby, a dose noise count function representing a relationship between the count number of dose noise and ambient dose is stored in the dose noise count function storage section 34 in advance.

Then, the dose correction calculating section 33 uses the dose noise count function stored in the dose noise count function storage section 34 to calculate the count number of dose noise based on the ambient dose that the dose measuring device 10 measures under the condition that the light based on the light emission of gas caused by alpha rays is collected and received by the photo detector 5.

Thus, from presence/absence of the count numbers of the light-emitting photons, the alpha rays can be detected on the display device 7. Further, by grasping a relationship between the count number and alpha dose in advance, the alpha dose can be quantified.

In calculating the above-described thermal noise count function, it is possible to measure the thermal noise while variously changing the temperature in a state where the dose noise is low enough to be negligible under the condition that the light based on the light emission of gas caused by alpha rays is not collected. Similarly, in calculating the dose noise count function, it is possible to measure the dose noise while variously changing the dose in a state where the thermal noise is low enough to be negligible.

Effect of Second Embodiment

As described above, the light-emitting photons of nitrogen caused by alpha rays are observed and counted in the photo detector 5. Then, a difference between this count result and count number stored in association with the measured temperatures in advance. This makes it possible to remove the count number of thermal noise inside the photo detector 5 to thereby calculate only the count number of the light-emitting photons of nitrogen. Thus, even when the amount of alpha rays is small and, accordingly, the number of light-emitting photons of nitrogen is small, the light-emitting photons can be counted, and alpha rays can be detected from presence/absence of the count numbers. Further, by grasping the relationship between the count number and alpha dose in advance, the alpha dose can be quantified.

Further, the light-emitting photons of nitrogen caused by alpha rays are observed and counted in the photo detector 5. Then, a difference between this count result and count number stored in association with the measured dose in advance. This makes it possible to remove the count number of dose noise inside the photo detector 5 to thereby calculate only the count number of the light-emitting photons of nitrogen. Thus, even when the amount of alpha rays is small and, accordingly, the number of light-emitting photons of nitrogen is small, the light-emitting photons can be counted, and alpha rays can be detected from presence/absence of the count numbers. Further, by grasping the relationship between the count number and alpha dose in advance, the alpha dose can be quantified.

Modification of Second Embodiment

Although both the temperature correcting unit 9 and dose correcting unit 11 are used to perform correction in the above description, it is possible to obtain sufficient accuracy in some circumstances even when only one of the temperature correcting unit 9 and dose correcting unit 11 is used and, in this case, cost reduction can be achieved. When the temperature correcting unit 9 is omitted, the temperature measuring device 8 becomes unnecessary. Alternatively, when the dose correcting unit 11 is omitted, the dose measuring device 10 becomes unnecessary.

Third Embodiment

Figure 6:
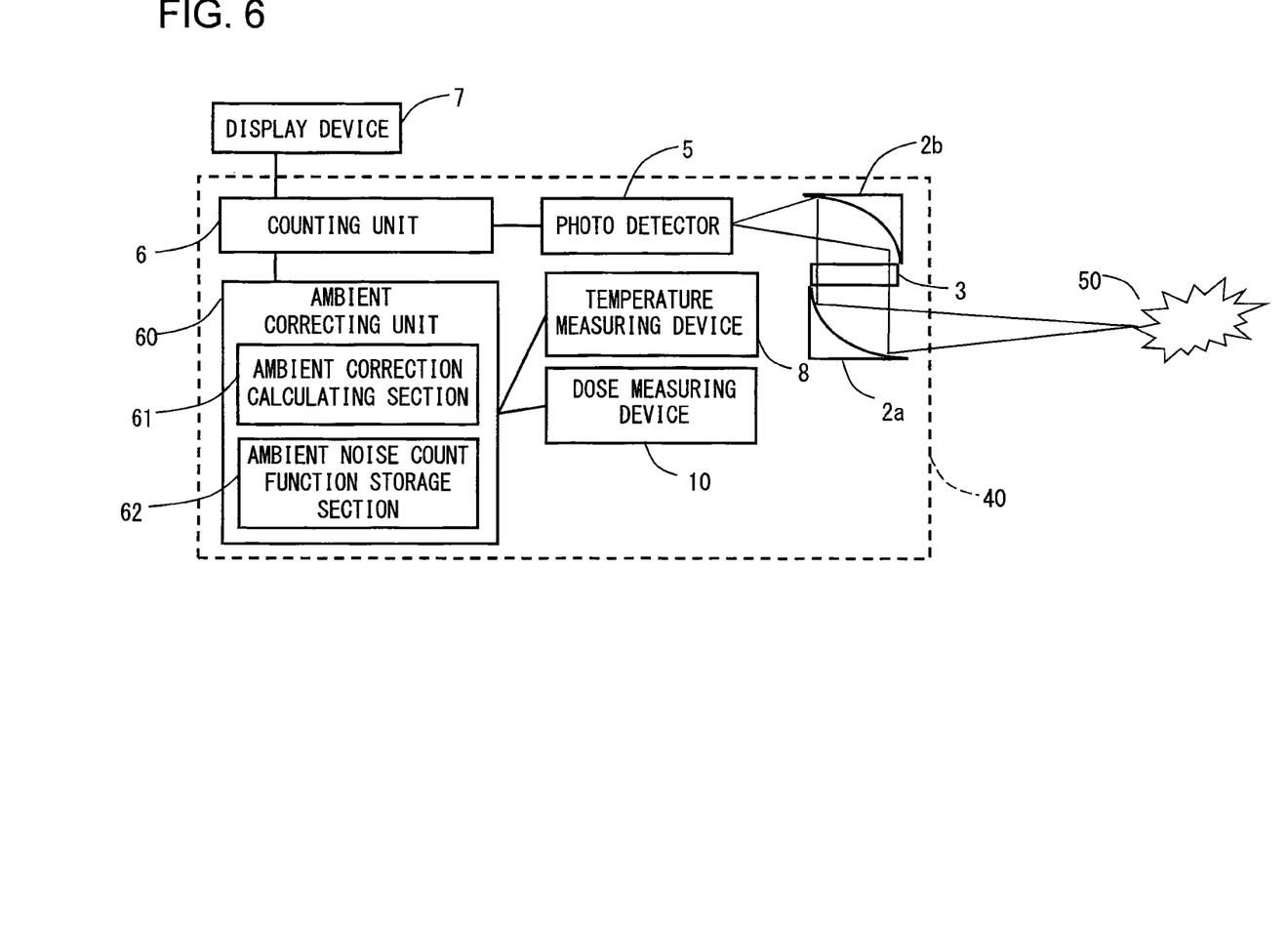
FIG. 6 is a block diagram illustrating a configuration of a third embodiment of the radiation detector according to the present invention.

A radiation detector according to a third embodiment of the present invention will be described using FIG. 6. The third embodiment is a modification of the second embodiment. In the second embodiment, the temperature correcting unit 9 and dose correcting unit 11 are separately provided, while in the third embodiment, there is provided an ambient correcting unit 60 in which the temperature correcting unit 9 and the dose correcting unit 11 are integrated. The ambient correcting unit 60 includes an ambient correction calculating section 61 and an ambient noise count function storage section 62. The same reference numerals are given to the same parts as in the second embodiment and the repeated description will be omitted.

In the second embodiment, influence of the thermal noise depending on the ambient temperature and influence of the dose noise depending on the ambient dose are separately evaluated and then separately corrected.

On the other hand, in the third embodiment, a combination of the influence of the thermal noise and influence of the dose noise is grasped as influence of ambient noise, and correction for the ambient noise is comprehensively performed.

That is, as a preparation stage before collection of the light based on light emission of gas caused by alpha rays and detection thereof, the temperature measuring device 8 and the dose measuring device 10 are used to measure the ambient temperature and the ambient dose in the vicinity of the photo detector 5 under the condition that the light based on the light emission of gas caused by alpha rays is not collected. Then, at the various measured ambient temperatures and the ambient doses, the count number of ambient noise, which is the number of noise photons obtained in the photo detector 5, is obtained and, thereby, an ambient noise count function representing a relationship between the count number of ambient noise and ambient temperature/ambient dose is calculated and stored in the ambient noise count function storage section 62 in advance.

Then, the ambient correction calculating section 61 uses the ambient noise count function stored in the ambient noise count function storage section 62 to calculate the count number of ambient noise based on the ambient temperature and the ambient dose that the temperature measuring device 8 and the dose measuring device 10 measure under the condition that the light based on the light emission of gas caused by alpha rays is collected and received by the photo detector 5.

Thus, from presence/absence of the count numbers of the light-emitting photons, the alpha rays can be detected on the display device 7. Further, by grasping a relationship between the count number and alpha dose in advance, the alpha dose can be quantified.

Fourth Embodiment

Configuration of Fourth Embodiment

Figure 7:
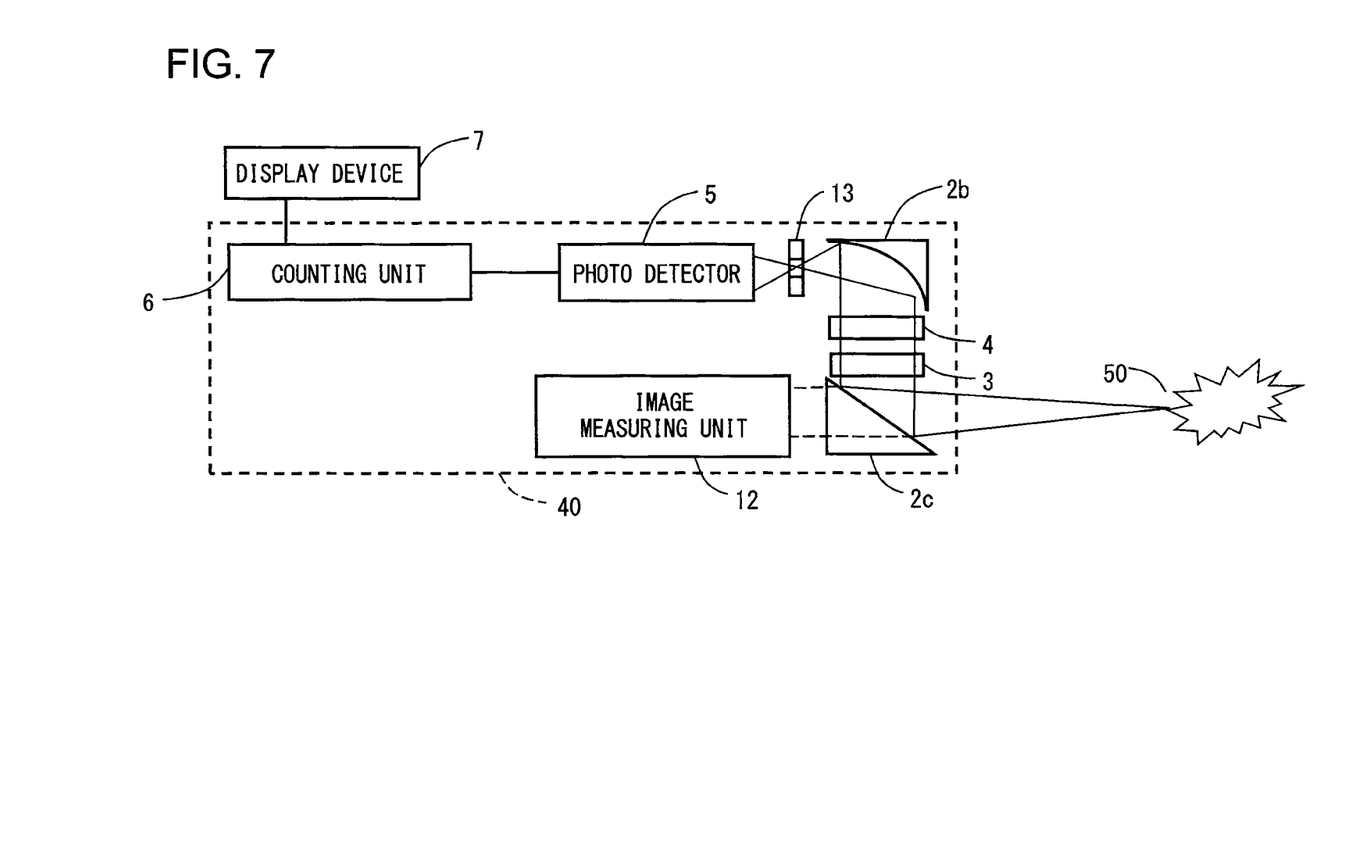
FIG. 7 is a block diagram illustrating a configuration of a fourth embodiment of the radiation detector according to the present invention.

A radiation detector according to a fourth embodiment of the present invention will be described using FIG. 7. The same reference numerals are given to the same parts as in the first embodiment and the repeated description will be omitted.

The radiation detector according to the fourth embodiment includes an image measuring unit 12 and an observation range selecting element 13, in addition to the light collecting members 2c and 2b, the wavelength selector 3, the shielding device 4, the photo detector 5, the counting unit 6, and the display device 7. Although the polarization selecting element 1 is not provided in the example of FIG. 7, the polarization selecting element 1 having the same configuration as that of the first embodiment may be provided at an entrance portion of the light collecting member 2c. The light collecting member 2c transmits a part of incident light and reflects the remaining part thereof. That is, the light collecting member 2c serves as a spectroscope.

The light collecting members 2c and 2b collect light based on light emission of gas caused by alpha rays. The light collecting members 2c and 2b are disposed such that light reflected by the light collecting member 2c is further reflected by the light collecting member 2b. The light collecting member 2c is constituted by a plane mirror and is coated with a coating that reflects ultraviolet rays emitted from nitrogen and transmits visible light.

The image measuring unit 12 is an image sensor that measures an image of visible light that has transmitted through the light collecting member 2c. The image measuring unit 12 may be constituted by a CCD camera, a CMOS camera, a photodiode array, or the like. Alternatively, the image measuring unit 12 may be constituted by a high-sensitivity image sensor such as an EMCCD, a cooled CCD, an image intensifier.

The observation range selecting element 13 is disposed between the light collecting member 2b and the photo detector 5, and is an optical element that limits an observation range. That is, the observation range selecting element 13 is an optical diaphragm. The observation range selecting element 13 is set at a focal position of the light collecting member 2b and can limit the observation range to a diameter of the light collecting member 2b.

In the present embodiment, the shielding device 4 is disposed between the wavelength selector 3 and the light collecting member 2b. The positions of the shielding device 4 and the wavelength selector 3 may be interchanged and, further, one or both of them may be disposed between the light collecting member 2b and the photo detector 5.

The configurations other than the above are the same as those of the first embodiment.

Operation of Fourth Embodiment

Light emitted from the light-emitting source 50 is collected by the light collecting members 2c and 2b, and the collected light is transmitted through the wavelength selector 3 and the shielding device 4, and is further transmitted through the observation range selecting element 13 to be received by the photo detector 5. At this time, the observation range is limited to the diameter of the light collecting member 2b by the observation range selecting element 13, so that noise light from outside the observation range can be removed. This can reduce the noise light in the observation light.

Further, by observing the observation range using the image measuring unit 12, presence/absence or a state of the noise light and a state of radioactive contaminants that may emit alpha rays can be checked. Thus, it is possible to reduce the noise light in the observation light by changing the observation range.

Then, the counting unit 6 can calculate the count number of the light-emitting photons of nitrogen by subtracting the count number of noise from a sum of the count number of the light-emitting photons of nitrogen and count number of noise, i.e. the number of noise photons, generated inside the photo detector 5. Thus, from presence/absence of the count numbers of the light-emitting photons, the alpha rays can be detected on the display device 7. Further, by grasping a relationship between the count number and alpha dose in advance, the alpha dose can be quantified.

Effect of Fourth Embodiment

As described above, the observation range within which the light emission of gas caused by alpha rays is observed can be limited to the diameter of the light collecting member 2b by the observation range selecting element 13, so that noise light from outside the observation range can be removed. This can reduce the noise light in the observation light, thereby allowing the photo detector 5 to selectively observe the light-emitting photons of nitrogen. Thus, even when the amount of alpha rays is small and, accordingly, the number of light-emitting photons of nitrogen is small, the light-emitting photons can be effectively counted, and alpha rays can be detected from presence/absence of the count numbers. Further, by grasping the relationship between the count number and alpha dose in advance, the alpha dose can be quantified.

Further, the observation range can be observed using the image measuring unit 12, so that it is possible to reduce the noise light in the observation light by changing the observation range, thereby allowing the photo detector 5 to selectively observe the light-emitting photons of nitrogen. Thus, even when the amount of alpha rays is small and, accordingly, the number of light-emitting photons of nitrogen is small, the light-emitting photons can be effectively counted, and alpha rays can be detected from presence/absence of the count numbers. Further, by grasping the relationship between the count number and alpha dose in advance, the alpha dose can be quantified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the features of the respective embodiments may be combined. As a more specific example, one or both of the observation range selecting element 13 and image measuring unit 12 of the fourth embodiment may be applied to the radiation detector according to the second embodiment.

What is claimed is:

1. A radiation detector comprising:
    a light collecting member that can collect observation light based on light emission of gas caused by alpha rays;
    a photo detector that can receive light collected by the light collecting member and count number of photons;
    a wavelength selector that is disposed on an optical path at an upstream side of the photo detector and can selectively transmit light based on the light emission of gas caused by alpha rays by selectively transmitting light of a wavelength in a specific range;
    a counting unit that is configured to calculate an alpha dose based on a difference subtracting a number of noise photons at the photo detector under a first condition where the light emission of gas caused by alpha rays is not collected to the photo detector, from the number of photons detected at the photo detector under a second condition where light emission of gas caused by alpha rays is collected to the photo detector; and
    a polarization selecting element that is disposed on an optical path at an upstream side of the light collecting member and reduces incidence of light other than the light based on light emission of gas caused by alpha rays that enters the photo detector depending on a polarization direction, by selecting a direction of the light that has been linearly polarized in which noise light is weakest so as to reduce noise light included in the observation light.

2. The radiation detector according to claim 1, further comprising a shielding device that is disposed on an optical path upstream side of the photo detector and that can switch between a closed state and an opened state to form the first condition and the second condition respectively,
    wherein the number of the noise photons is counted by the photo detector while the shielding device is switched to the closed state.

3. The radiation detector according to claim 1, further comprising:
    a temperature measuring device that measures an ambient temperature in a vicinity of the photo detector;
    wherein the noise photons includes thermal noise,
    wherein the number of the noise photons is configured to be calculated based on a thermal noise count function representing a relationship between a count number of the thermal noise and the ambient temperature measured by the temperature measuring device in the first condition.

4. The radiation detector according to claim 3, further comprising:
    an ambient dose measuring device that measures an ambient dose in a vicinity of the photo detector;
    wherein the noise photons includes the thermal noise and dose noise,
    wherein the number of the noise photons is configured to be calculated based on the thermal noise count function and a dose noise count function representing a relationship between a count number of the dose noise and the ambient dose measured by the ambient dose measuring device in the first condition.

5. The radiation detector according to claim 1, further comprising:
    an ambient dose measuring device that measures an ambient dose in a vicinity of the photo detector;
    wherein the noise photons includes dose noise,
    wherein the number of the noise photons is configured to be calculated based on a dose noise count function representing a relationship between a count number of the dose noise and the ambient dose measured by the ambient dose measuring device in the first condition.

6. The radiation detector according to claim 1, further comprising:
    an ambient dose measuring device that measures an ambient dose in a vicinity of the photo detector; and
    a temperature measuring device that measures an ambient temperature in the vicinity of the photo detector;
    wherein the noise photons includes dose noise,
    wherein the number of the noise photons is configured to be calculated based on an ambient noise count function representing a relationship among a count number of ambient noise, the ambient dose measured by the ambient dose measuring device, and the ambient temperature measured by the temperature measuring device in the first condition.

7. The radiation detector according to claim 1, further comprising an observation range selecting element which is disposed on an optical path upstream side of the photo detector and which removes light that enters the photo detector from outside an observation range.

8. The radiation detector according to claim 1, further comprising an image measuring unit that measures an image of a range within which the light based on light emission of gas caused by alpha rays.

9. The radiation detector according to claim 8, wherein
the light based on light emission of gas caused by alpha rays is ultraviolet rays,
the light collecting member has a spectroscope that separates light into ultraviolet rays and visible light rays, and collects the separated ultraviolet rays, and
the image measuring unit performs the image measurement based on the visible light rays separated by the spectroscope.

10. A radiation detector comprising:
a light collecting member that can collect light based on light emission of gas caused by alpha rays;
a photo detector that can receive light collected by the light collecting member and count number of photons;
a wavelength selector that is disposed on an optical path at an upstream side of the photo detector and can selectively transmit light based on the light emission of gas caused by alpha rays by selectively transmitting light of a wavelength in a specific range, and
a counting unit that is configured to calculate an alpha dose based on a difference subtracting a number of noise photons at the photo detector under a first condition where the light emission of gas caused by alpha rays is not collected to the photo detector, from the number of photons detected at the photo detector under a second condition where light emission of gas caused by alpha rays is collected to the photo detector, wherein
the light collecting member includes:
  a first concave mirror for reflecting and collecting the light; and
  a second mirror, wherein
  the first concave mirror has a through hole formed therein for the light reflected on the first collecting mirror and the second mirror to pass through.

11. A radiation detection method comprising:
selecting polarization of observation light based on light emission of gas caused by alpha rays depending on a polarization direction, by selecting a direction of the light that has been linearly polarized in which noise light is weakest so as to reduce noise light included in the observation light;
collecting the light as collected light based on light in which the polarization has been selected in the selecting polarization step;
selectively transmitting the collected light having a specific wavelength range;
detecting the light collected and selectively transmitted by a photo detector;
obtaining a number of noise photons at the photo detector in a shielded condition where the light based on light emission of gas caused by alpha rays is shielded; and
calculating an alpha dose based on a difference subtracting the number of noise photons obtained from the number of photons detected at the photo detector.

12. The radiation detection method according to claim 11, wherein the number of the noise photons is obtained by counting a number of the photons detected at the photo detector in the shielded condition.

13. The radiation detection method according to claim 11, further comprising:
determining a thermal noise count function representing a relationship between the count number of thermal noise at the photo detector and an ambient temperature in the shielded condition; and
measuring a temperature in a vicinity of the photo detector during collecting the light as the collected light;
wherein the number of the noise photon is calculated with the thermal noise count number based on the thermal noise count function by substituting the temperature measured in the vicinity of the photo detector as the ambient temperature.

14. The radiation detection method according to claim 11, further comprising:
determining a dose noise count function representing a relationship between a count number of dose noise and an ambient dose in the shielded condition;
measuring an ambient dose in a vicinity of the photo detector during collection of the light as the collected light;
wherein the number of the noise photon is calculated with the count number of dose noise based on the dose noise count function by substituting the ambient dose in the vicinity of the photo detector as the ambient dose.

* * * * *